US008434696B2

(12) United States Patent
Wright

(10) Patent No.: US 8,434,696 B2
(45) Date of Patent: May 7, 2013

(54) SELF REGULATING FLUID BEARING HIGH PRESSURE ROTARY NOZZLE WITH BALANCED THRUST FORCE

(75) Inventor: Douglas E. Wright, Durango, CO (US)

(73) Assignee: Stoneage, Inc., Durango, CO (US)

( * ) Notice: Subject to any disclaimer, the term of this patent is extended or adjusted under 35 U.S.C. 154(b) by 0 days.

(21) Appl. No.: 13/495,723

(22) Filed: Jun. 13, 2012

(65) Prior Publication Data

US 2012/0255588 A1 Oct. 11, 2012

Related U.S. Application Data

(60) Division of application No. 13/210,016, filed on Aug. 15, 2011, now Pat. No. 8,220,724, which is a division of application No. 12/577,571, filed on Oct. 12, 2009, now Pat. No. 8,016,210, which is a continuation-in-part of application No. 11/208,225, filed on Aug. 19, 2005, now Pat. No. 7,635,096.

(60) Provisional application No. 61/196,304, filed on Oct. 16, 2008.

(51) Int. Cl.

| | |
|---|---|
| ***B05B 3/06*** | (2006.01) |
| ***B05B 3/04*** | (2006.01) |
| ***B05B 3/02*** | (2006.01) |
| ***F16J 15/40*** | (2006.01) |
| ***F16J 15/44*** | (2006.01) |
| ***F01D 11/02*** | (2006.01) |

(52) U.S. Cl.
USPC ......... 239/259; 239/225.1; 239/251; 134/198

(58) Field of Classification Search ............... 239/225.1, 239/246, 251, 252, 254, 256, 257, 259, 261, 239/264, 397, 598, DIG. 8; 277/377, 387, 277/388, 401, 403, 409, 411, 408; 134/167 R, 134/172, 179, 198; 175/67, 107, 424; 415/80
See application file for complete search history.

(56) References Cited

U.S. PATENT DOCUMENTS 1,977,763 A 2/1932 Gordon
4,821,961 A 4/1989 Shook (Continued)

FOREIGN PATENT DOCUMENTS

WO WO 2007/053229 5/2007

OTHER PUBLICATIONS

International Search Report and Written Opinion, dated Jan. 10, 2008, from co-owned International Application No. PCT/US2006/032588.

(Continued)

*Primary Examiner* — Darren W Gorman
(74) *Attorney, Agent, or Firm* — Greenberg Traurig LLP

(57) ABSTRACT

A high pressure rotary nozzle having a rotating shaft operating within a fixed housing wherein the of axial force which acts upon the shaft due to the fluid pressure at the shaft inlet is balanced by allowing passage of a small amount of the pressurized fluid to be bled to an area or chamber between the outside of the opposite end of the shaft and the inside of the housing where the fluid pressure can act axially in an opposing direction upon the shaft to balance the axial inlet force. The balance of axial forces is self-regulating by controlling escape of the fluid through a tapered or frusto-conical region between the shaft and housing. This further provides a fluid bearing between the two surfaces and allows use of interchangeable rotating jet heads having jet orifices which can be oriented in virtually any desirable configuration including axially forward of the nozzle.

10 Claims, 5 Drawing Sheets

U.S. PATENT DOCUMENTS

| | | | |
|---|---|---|---|
| 5,096,122 | A | 3/1992 | Abromska |
| 5,104,043 | A | 4/1992 | Pacht |
| 5,135,015 | A | 8/1992 | Young |
| 5,195,585 | A | 3/1993 | Clemens et al. |
| 5,217,163 | A | 6/1993 | Henshaw |
| 5,248,095 | A | 9/1993 | Rankin et al. |
| 5,456,413 | A | 10/1995 | Ellis |
| 5,531,383 | A | 7/1996 | Pacht |
| 5,685,487 | A | 11/1997 | Ellis |
| 5,857,623 | A | 1/1999 | Miller et al. |
| 5,964,414 | A | 10/1999 | Hardy et al. |
| 6,027,040 | A | 2/2000 | Frye-Hammelmann |
| 6,059,202 | A | 5/2000 | Zink et al. |
| 6,622,941 | B2 | 9/2003 | Ganoza et al. |
| 6,698,669 | B2 | 3/2004 | Rieben |
| 7,063,274 | B2 | 6/2006 | Feller et al. |
| 7,198,456 | B2 | 4/2007 | Kollé et al. |
| 7,201,238 | B2 | 4/2007 | Marvin et al. |
| 7,594,614 | B2 | 9/2009 | Vijay et al. |
| 2008/0035184 | A1 | 2/2008 | Wagner et al. |

OTHER PUBLICATIONS

International Search Report and Written Opinion, dated Jun. 18, 2010, from co-owned International Application No. PCT/US2009/069436.

Supplementary European Search Report, dated Nov. 20, 2009, from co-owned European Patent Application No. 06844163.3.

SELF REGULATING FLUID BEARING HIGH PRESSURE ROTARY NOZZLE WITH BALANCED THRUST FORCE

CROSS REFERENCE TO RELATED APPLICATIONS

This application is a divisional of U.S. patent application Ser. No. 13/210,016, filed Aug. 15, 2011, which is a divisional of U.S. patent application Ser. No. 12/577,571, filed Oct. 12, 2009, entitled SELF REGULATING FLUID BEARING HIGH PRESSURE ROTARY NOZZLE WITH BALANCED THRUST FORCE, now U.S. Pat. No. 8,006,920, which is a Continuation-In-Part of U.S. patent application Ser. No. 11/208,225 filed Aug. 19, 2005, now U.S. Pat. No. 7,635,096, and which claims the benefit of priority of U.S. Provisional Patent Application Ser. No. 61/196,304, filed Oct. 16, 2008. The contents of these applications are hereby incorporated by reference in their entirety.

BACKGROUND OF THE INVENTION

The present invention provides a simplified and reliable construction for a high-pressure rotating water jet nozzle which is particularly well suited to industrial uses where the operating parameters can be in the range of 1,000 to 40,000 psi, rotating speeds of 1000 rpm or more and flow rates of 2 to 50 gpm. Under such use the size, construction, cost, durability and ease of maintenance for such devices present many problems. Combined length and diameter of such devices may not exceed a few inches. The more extreme operating parameters and great reduction in size compound the problems. Pressure, temperature and wear factors affect durability and ease of maintenance and attendant cost, inconvenience and safety in use of such devices. Use of small metal parts and poor quality of materials in such devices may result in their deterioration or breakage and related malfunctioning and jamming of small spray discharge orifices or the like. The present invention addresses these issues by providing a simplified construction with a greatly reduced number of parts and a design in which net operating forces on nozzle components are minimized.

SUMMARY OF THE INVENTION

This invention provides a nozzle for use in a high pressure (HP) range of approximately 1,000 to 40,000 psi having a "straight through" fluid path to a jet head at an end of the device where the head is preferably capable of providing rotating coverage of greater than hemispherical extent, including the area directly along the axis of rotation of the device. In a typical nozzle assembly the internal forces resulting from such operating pressures tend to create an axial thrust force acting against the nozzle shaft with the force corresponding to the operating pressure and cross sectional area of the shaft. An example of a prior art device using mechanical bearings is shown in Applicants' prior U.S. Pat. No. 6,059,202. This prior art device provides the benefit that pressurized operating fluid can take a "straight through" from the inlet for the fluid source to the nozzle head. However, in this device the rotating nozzle shaft is supported against the internal axial thrust forces by a series of stacked bearings, with plural bearings being used to bear the relatively high thrust load without increasing the diameter of the device. In such devices the mechanical bearings have been used to serve as both radial and thrust bearings, however the size and/or quantity of such bearings has been dictated primarily by the need to resist thrust forces.

It has generally been considered desirable to keep the diameter of any rotating portions of a nozzle smaller than the largest diameter of such a nozzle so that contact between the rotating portions and any surface being cleaned is minimized or eliminated thereby minimizing abrasive wear to the nozzle and interference with the rotational movement of the nozzle jets. Other prior art devices have used nozzles which rotate around a central tube which provides the fluid source. However for the aforementioned reason, such devices, while being able to provide a cylindrical path of coverage with their rotating bodies, have not been well adapted to both providing a rotating coverage which can include a path very close to the rotational axis of the device and an "straight-through" fluid path.

In contrast to such prior art devices, the device of the present invention provides a much simplified structure which also provides a straight-through fluid path in which the pressure of the operating fluid is also allowed to reach and act upon opposing surfaces of the rotating nozzle shaft so as to effectively balance any axial thrust force. Further a small detachable jet head having a diameter smaller than the body of the nozzle can be attached at the leading end of the nozzle to provide an improved coverage pattern for the high-pressure fluid. This is accomplished by providing a "bleed hole" to allow a small portion of pressurized fluid to reach a chamber or channel within the housing but outside the exterior of the forward portion of the nozzle shaft where the fluid pressure can act upon the nozzle shaft with a sufficient axial component so as to balance the corresponding axial component against the nozzle shaft created by the internal fluid pressure. This chamber or channel communicates with the exterior of the device by means of a slightly tapered frusto-conical bore surrounding a corresponding tapered portion of the shaft which further allows the fluid to flow between the body and the shaft to facilitate or lubricate the shaft rotation.

Because of the tapered shape, the spacing between the housing and the shaft varies slightly with axial movement of the shaft and creates a "self balancing" effect in which the axial forces upon the shaft remain balanced and there is always some fluid flowing between the shaft and housing which helps decrease contact and resulting wear between these two components. Due to the lack of any significant imbalanced radial forces and the fluid flowing between the surfaces of the shaft and housing, a device of the present invention can be constructed without need for mechanical bearings.

In addition, around the inlet end of the shaft an annular groove or channel is provided in the inside surface of the housing body abutting the inlet end portion of the shaft. Surprisingly, this annular channel enhances bleed flow of fluid around the inlet end of the shaft to substantially reduce the effects of rotationally induced precession on the shaft, thus improving the operability of the nozzle.

Among the objects of the invention is to simplify the configuration of moving parts of a small high pressure spray nozzle to reduce the cost, number of parts and facilitate economical manufacture and replacement of the wearable parts.

Another object of the invention is to provide improved operation of rotatable high pressure nozzles by improving the configuration of the bearing parts and eliminating use of mechanical bearings heretofore used to resist high axial forces generated by the fluid pressures usually involved.

Another object of the invention is to help achieve a small durable light weight elongated and small diameter rotating high pressure spray nozzle assembly which can be conveniently carried on the end of a spray lance and readily inserted into small diameter tubes and the like to clean the same as well as being usable on other structures or large flat areas.

Another object of the invention is to provide a rotating high pressure jet in which the need for ongoing maintenance is minimized.

Another object of the invention is to provide a rotating nozzle in which forces acting upon the rotating shaft from the operating fluid are balanced to eliminate the need for separate mechanical thrust bearings.

Another object of the invention is to provide a rotating nozzle which is simple and mechanically reliable when operated at very high pressures and in very small diameters such as those required for cleaning heat exchanger tubes.

Another object of the invention is to provide a rotating nozzle in which rotating shaft is supported and lubricated by the operating fluid without need for separate mechanical bearings or separate lubricant.

A further object of the invention is to provide a rotating nozzle for use with a high pressure fluid without the need for tight mechanical seals between relatively rotating parts.

A further object of the invention is to provide a rotating nozzle for use with a high pressure fluid in which jet heads of varying configurations are readily interchangeable.

Another object of the invention is to provide a nozzle with small detachable jet head having a diameter smaller than the body of the nozzle and which can provide an unrestricted spray in a path including a forward axial direction.

DETAILED DESCRIPTION OF THE INVENTION

Figure 2:
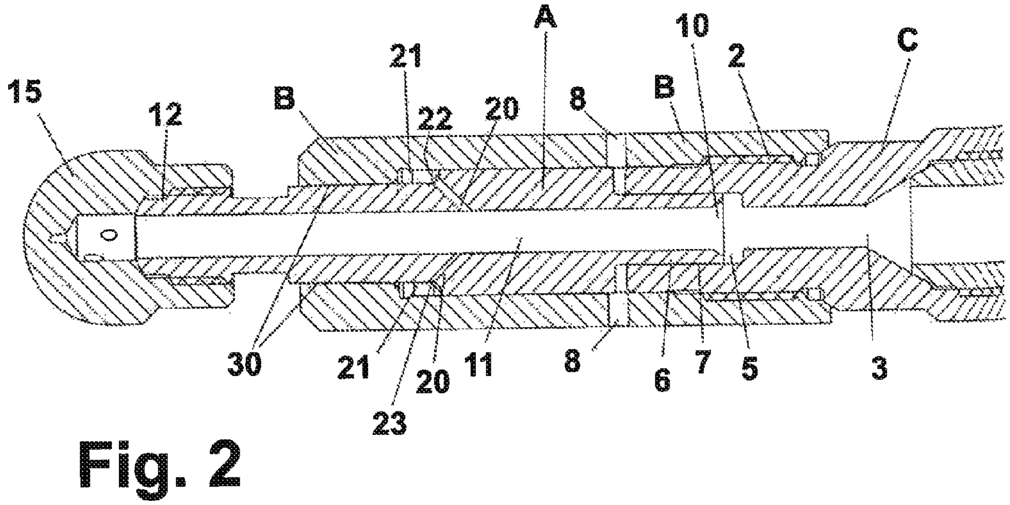
FIG. 2 is a cross-section of the nozzle of an alternative embodiment in which the balancing chamber is separate from the tapered regulator passage.

As can be seen most clearly in FIG. 2, one embodiment of the present invention includes a simple three-piece rotary nozzle structure. A hollow cylindrical rotary shaft A is contained in a two part housing or body comprised of an inlet portion C and an outlet portion B. The housing portions are secured together and sealed using threading or other similar fastening means 2 which allows assembly and disassembly of the device including allowing shaft A to be readily inserted or removed. The inlet portion C provides an inlet 3 for high-pressure fluid fed to the device by hose or other similar means attached to the inlet by any suitable means, most commonly a mated threaded fitting. A suitable material for each of the nozzle portions will have fairly high strength and resistance to galling, for example, any of various high nickel stainless steels. A bronze tubular shaft A or bronze body B may alternatively be used for enhanced galling resistance. A surface treatment or plating may be used for any known benefits such as lubricity or abrasion resistance.

At the opposite end of the housing inlet portion is a cylindrical cavity 5 which receives the inlet end 6 of the rotating shaft A. The annular interface 7 between the housing and shaft is sized so as to minimize leakage while still allowing rotation of the shaft A with a slight cushion of fluid. Typically the gap of the interface 7 will be approximately 0.0025" to 0.0005". Some passage of fluid at the interface 7 is desirable in order to allow a fluid layer to facilitate the rotating movement between the shaft A and body portion B. Elimination of the need of a seal at interface 7 reduces manufacturing expense and complexity in providing such a seal. Body portion B is provided with radial "weep" holes 8 to the exterior for escape of fluid passing the interface 7 or other paths along the exterior of shaft A.

The shaft inlet 10 is open to the cavity 5 to of provide direct flow of fluid into the central of bore 11 of the shaft A. Under normal operation the pressurized fluid exerts an axial force on the inlet end 6 of shaft A which will be referred to herein as the "input force." This force is directly proportional to (1) the area of the inlet end 6 perpendicular to the direction of fluid flow and (2) the pressure of the fluid. It is this axial force which the present invention is intended to counteract with an equal opposing force.

As the fluid enters the shaft most of the fluid will pass through the central bore of the shaft to exit through the nozzle head 15 attached to the outlet end 12 of the shaft. Head 15 will typically be provided with exit holes or orifices 16 positioned to direct high pressure fluid toward a surface to be cleaned and oriented to impart a reactive force to rotate the head and shaft.

A significant feature which eliminates the need for dedicated thrust bearings is the provision of one or passages 20 which communicate between the central bore 11 of the shaft and a chamber 21 defined between the outer surface of shaft A and the inner surface of the housing portion B and having an outlet with sufficient restriction to retain fluid pressure within the chamber.

Passage or passages 20 are ideally configured to allow the pressurized fluid to reach chamber 21 with minimal restriction to allow sufficient pressure to be achieved within chamber 21 so as to act upon the annular surface of the shaft created by the stepped shoulder portion 22. Alternatively, for extreme pressure operation, e.g. operating in a range of 40,000 psi, passages 20 may be sized to restrict the fluid pressure reaching the chamber 21. The stepped shoulder portion 22 has a surface 23 which is directly perpendicular to the axis of the device. Fluid pressure acting upon this surface creates a thrust force (which will be designated herein as the "resistive force") having a net axial component acting upon the shaft which is opposed to and capable of countering the input force described previously.

Figure 3:
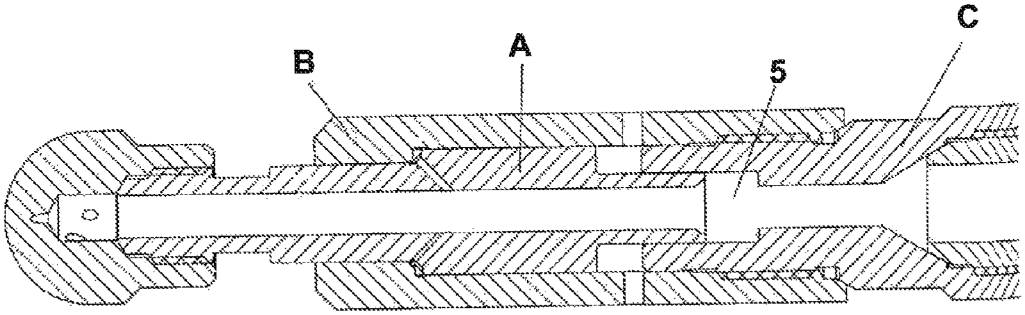
FIG. 3 is a cross-section corresponding to FIG. 2 showing the shaft in a slightly different axial position.

In the embodiment shown in FIGS. 2 and 3 suitable dimensions are a shaft diameter 0.182" at inlet 10, an outer and inner diameters of 0.326" and 0.257" respectively of chamber 21. The corresponding angle of taper of both shaft and housing along gap 30 is 0.57 degrees, with the housing inner diameter tapering from 0.257" to 0.250" over the length of the taper.

In order that the input and resistive forces may remain balanced the chamber or cavity 21 is provided with an outlet and regulator passage along the path defined by the narrow frusto/conical gap 30 between correspondingly shaped portions of shaft A and housing portion B. The tapered configuration allows variation in the size of the gap as the shaft moves axially with respect to the housing. For example, the width of gap 30 may vary, being approximately 0.0001" as the shaft A is positioned toward the jet head shown in FIG. 3. As the shaft moves to the position toward the inlet shown in FIG. 2, the width of gap 30 may open to approximately 0.001". A larger gap allows greater escape of pressurized fluid resulting in corresponding decrease in the resistive force acting upon the shaft. Conversely, a smaller gap allows an increase of pressure. Any imbalance between the input and resistive forces tends to cause some axial movement of the shaft, which increases or reduces the gap in a manner which tends to re-balance these opposing forces. Accordingly, a state of equilibrium is reached where the input and resistive forces remain dynamically balanced.

Figure 1:
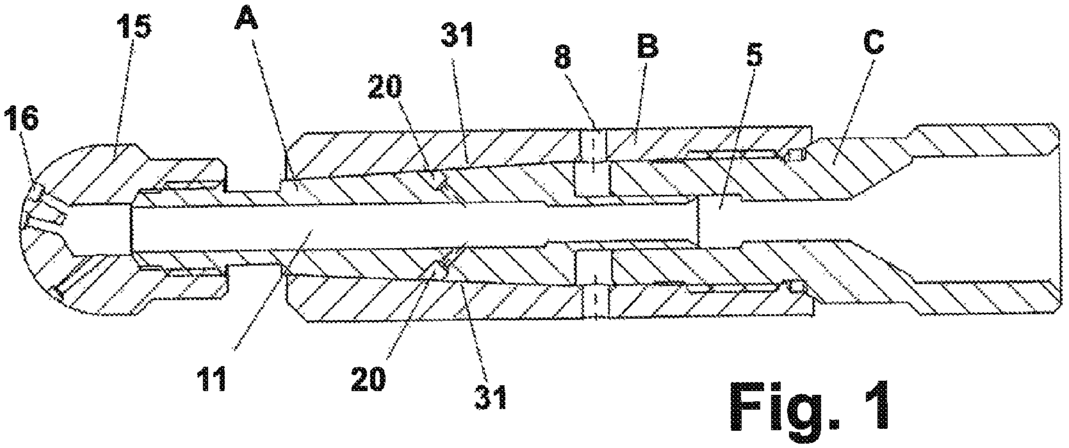
FIG. 1 is a cross-section of the nozzle of the preferred embodiment in which a tapered regulator passage also serves as a balancing chamber.

Another embodiment of the present invention is shown in FIG. 1 in which the functional features described are combined and provided in a simplified structure. For there to be an axial resistive force it is unnecessary that there be a surface which is actually perpendicular to the shaft axis as described above so long as there is a surface with an areal component which is effectively perpendicular to the rotational axis. In the simplified structure shown in FIG. 1 the port from the shaft bore 11 communicates directly with the tapered outlet passage 31, which serves the dual function of being a balancing chamber or cavity, where a balancing resistive force is created and a regulator passage, to control the amount of pressure which creates the resistive force. Since a force acting at any point on the frusto-conical surface imparts both a radial force and an axial force, the total of such forces over the surface creates a net axial force and with no net radial force. The following table illustrates suitable dimensions in inches for various parameters for flows between 8 and 50 gallons per minute using the tapered design of one of the preferred embodiments.

| | Design Flow: | | | |
|---|---|---|---|---|
| LOCATION | 8 gpm | 15 gpm | 35 gpm | 50 gpm |
| Inner diameter through tool (determines flow capacity) | 0.096 | 0.150 | 0.240 | 0.300 |
| (inlet end of shaft diameter) | 0.1410 | 0.220 | 0.345 | 0.430 |
| (largest shaft diameter) | 0.3250 | 0.506 | 0.750 | 0.840 |
| (shaft diameter @ small end of taper) | 0.2530 | 0.375 | 0.560 | 0.560 |
| (inlet inside diameter) | 0.1420 | 0.221 | 0.346 | 0.431 |
| (body inside diameter - large end of taper) | 0.3250 | 0.560 | 0.750 | 0.840 |
| (body inside diameter - small end of taper) | 0.2535 | 0.376 | 0.561 | 0.561 |
| (length of inlet end of shaft) | 0.260 | 0.260 | 0.260 | 0.260 |
| (length of taper) | 0.7450 | 1.242 | | |

Figure 4:
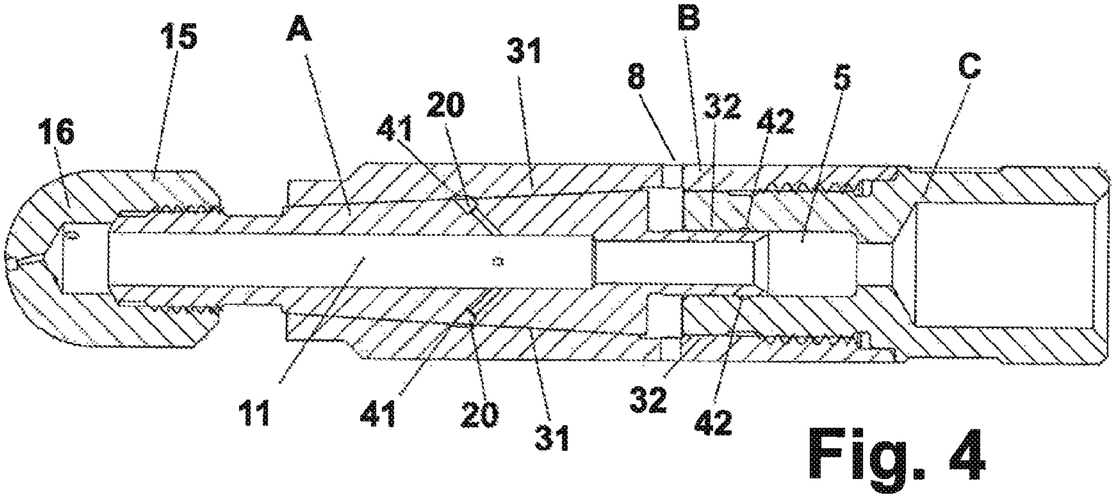
FIG. 4 is a cross-section of a structural variation of the nozzle shown in FIG. 1 in which an annular groove is provided in each of the bearing areas of the nozzle body.

Another embodiment is shown in FIG. 4. This figure shows a variation of the nozzle structure of FIG. 1 in which identified elements are structurally equivalent and accordingly are correspondingly numbered. The annular groove 41 around the tapered portion of housing portion B facilitates distribution of the pressurized fluid as it exits the bores 20 in the shaft A into the regulator passage 31 between the frusto-conical tapered portions of the housing portion B and the similarly tapered portion of the shaft A.

Surprisingly, general functional characteristics of the structure of FIG. 1 have been found to be unexpectedly enhanced by the addition of a circumferential annular groove or chamber 42 in the inside wall of the portion C abutting the inlet bearing area 32 of shaft A, as shown in FIG. 4. This channel or chamber 42 provides a continuous unrestricted circumferential fluid circulation path around the shaft A in the inlet bearing area 32 between the rotating shaft A, and body portion C. Although inlet fluid is designed to weep axially past the inlet bearing area 32 in the embodiments shown in FIGS. 1-3, the presence of this groove in the embodiment shown in FIG. 4 surprisingly improves shaft stability. It is believed that the channel 42 may enhance circumferential distribution of the small weepage flow around the shaft A passing through the bearing area 32 which in turn minimizes the effects of precession of the shaft axis during operation. The result is a decreased, or at least maintenance of constancy of, the level of mechanical friction which may occur between the relative movable parts and which would otherwise impede the rotational motion.

As shown in FIG. 4, this annular channel, or chamber 42, preferably has a generally rectangular cross sectional shape, although other shapes may result in similar performance. Optimally only a single channel 42 is provided. Preferably the single channel 42 may have a width of between about 0.030 to about 0.050 inches and a depth of between about 0.020-0.030 inches. Although the chamber 42 may alternatively be formed in the outer surface of the inlet end of the shaft A, optimal results appears to be achieved with the chamber 42 formed in the inlet bearing area 32 of the housing portion C. The annular chamber 41 is created by a groove machined into the inner surface of the housing portion B. Alternatively, it is believed that a similar groove could be machined into the external surface of shaft A rather than in the housing portion B in order to achieve similar results. The groove 42 is an annular channel having a substantially rectangular cross section. The groove 41 is an annular channel having an arcuate cross section. The cross sectional configurations may be reversed between grooves 41 and 42 although a curved cross section of groove 41 is preferred in the tapered portion of shaft A adjacent the shaft bore 20. Alternatively the grooves 41 and 42 may have different cross sectional shapes.

Figure 5:
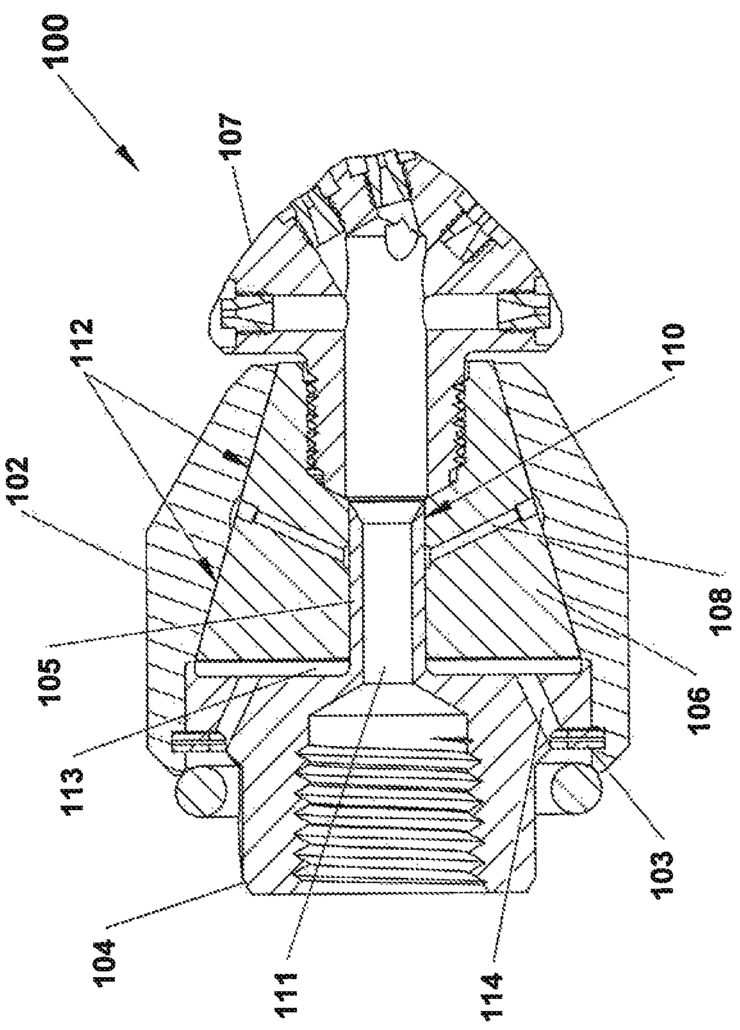
FIG. 5 is a cross-sectional view of another embodiment of a nozzle in accordance with the present invention.

Another embodiment of a nozzle 100 is shown in FIG. 5. This nozzle 100 is similar to nozzle 10 shown in FIG. 1 except that the total leakage rate required to balance the rotation of the nozzle 100 is reduced by approximately a factor of 4. As in FIG. 1, nozzle 100 as a body 102 fastened to a high pressure inlet nut 104. The inlet nut 104 is fastened to the body 102 via a retainer ring 103. Captured between the body 102 and the inlet nut 104 is a frusto-conical shaft 106 rotatably supported on the stem 105 forming an inlet bearing area of the inlet nut 104. A spray head 107 is fastened to the shaft 106 so that both shaft 106 and head 107 rotate together as an integral unit. The inlet nut 104 and its inlet bearing area, stem 105, has a central bore 111 that directs fluid flow into and through corresponding spray bores in the head 107.

During operation, high pressure fluid is introduced through the central bore 111 in the inlet nut 104. This high pressure fluid passes out through the head 107. A portion of the fluid flows around and along leakage path 110 along the inlet bearing area, i.e., the outside of the stem 105, through passages 108 in the shaft 106 to the frusto-conical tapered interface between the body 102 and the shaft 106. This fluid then diverges and flows outward in opposite directions, first forward along leakage path 112 to exit the nozzle 100 around the head 107 and also rearward along path 112 to the clearance space 113 between the inlet nut 104 and the rear face of the shaft 106. This portion of the fluid then passes through bores 114 in the inlet nut 104 and past the retainer 103 to atmosphere. As in the embodiment shown in FIG. 1, the shaft 106 becomes dynamically balanced on the stem 105 during operation such that mechanical bearings are not required. The lubricity of the fluid flowing through leak paths 110 and 112 sufficiently supports and lubricates the shaft 106 and attached spray head 107. In this embodiment, the leak path 110 generates about a 90% drop in pressure by the time fluid gets to the passages 108 to supply fluid to the outer taper, i.e. leak paths 112. This allows a reduction of the total leakage rate by a factor of about 4 times.

Figure 6:
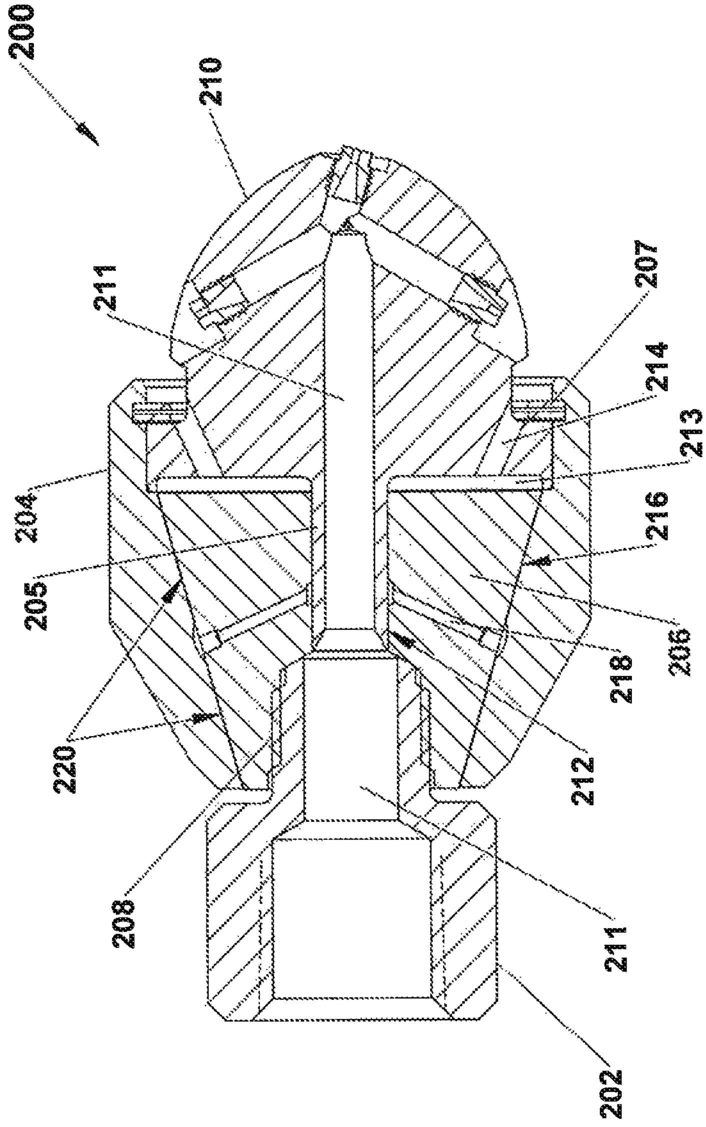
FIG. 6 is a cross-sectional view of another embodiment of a nozzle in accordance with the present invention.

A further alternative embodiment 200 of a nozzle in accordance with the present invention is shown in FIG. 6. In this alternative embodiment, the spray head 210 and body 204 are attached together and rotate about the shaft 206, which is fastened to the inlet nut 202. Nozzle 200 has the inlet nut 202 fastened to the frusto-conical shaft 206 via threads 208. The body 204 has a complementary frusto-conical shaped cavity that matches and interfaces with that of the shaft 206. In this embodiment, the stem 205 is attached, or an integral part of the spray head 210 rather than being an integral part of the inlet nut 202 as in nozzle 100. Spray head 210 is secured also to the body 204 via split ring retainer 207 such that the spray head 210 and body 204 rotate as a single unit. When nozzle 200 is assembled, the frusto-conical outer surface of the shaft 206 and the frusto-conical inner surface portion of the body 204 form a tapered frusto-conical leakage path 220.

During operation, high pressure fluid is introduced through the central bore 211 through the inlet nut 202. This high pressure fluid passes out through the head 210. A portion of the fluid flows around and along leakage path 212 along the inlet bearing area, i.e., the outside of the stem 205, through passages 218 in the shaft 206 to the interface (regulating passage) between the frusto-conical tapered portions of the body 204 and the shaft 206. This fluid then diverges and flows outward in opposite directions, first forward along leakage path 220 to the clearance space 213 and thence through bores 214 to atmosphere around the head 210 and also rearward along path 220 to atmosphere at the nut 202. As in the embodiments shown in FIGS. 1 and 4, the body 204 and head 210 becomes dynamically balanced on the stem 205 within the shaft 206 during operation such that mechanical bearings are not required. The lubricity of the fluid flowing through leak paths 220 around the interface 216 and path 212 along the stem 205 sufficiently supports and lubricates the body 204 and attached spray head 210 on the shaft 206. In this embodiment, the leak path 212 generates about a 90% drop in pressure by the time fluid gets to the passages 218 to supply fluid to the outer taper, i.e. leak paths 220. This allows a reduction of the total leakage rate by a factor of about 4 times as in the nozzle 100.

Thus comparing embodiment 200 with embodiment 100, it can be seen that in both embodiments, the body and shaft rotate relative to each other. They both have complementary tapered surface shapes, together forming a regulating passage, or leakage paths 112, 220 therebetween. In nozzle 100, the shaft 106 is fastened to the head 107 and rotates therewith. In nozzle 200, the shaft 206 is fastened to the inlet nut 202 and held stationary, while the body 204 is fastened to the spray head 210 and rotates around the stationary shaft 206 via stem 205. Note that in nozzle 200 the stem 205 is integral with and extends from the spray head 210 rather than the nut 104 as in the nozzle 100. Thus in both embodiments of the nozzle 100 and 200, the body 102, 204 and shaft 106, 206 rotate relative to each other and about the stem 105 and 205 respectively. In both nozzles 100 and 200, inlet fluid flows through bore 111, 211 to the spray head 107, 210, and fluid flows from the inlet nut 104 and 202 into and through a first leakage path 110, 212 around the stem 105, 205 to bores 108, 218 between the shaft 106, 206 and the stem 105, 205, and then through the bores 108, 218 to the frusto-conical interface 110, 216 of the body 102, 204. Fluid then diverges and flows along the frusto-conical interface leakage paths 112, 220, i.e., the regulating passage, in both embodiments out to atmosphere, adjacent the nut 104, 202 and through bores 114, 214.

Thus comparing embodiment 200 with embodiment 100, it can be seen that in both embodiments, the body and shaft rotate relative to each other and they both have complementary frusto-conical tapered surface shapes, together each forming a regulating passage, i.e., leakage paths 112, 220 therebetween. Pressure of fluid within the regulating passage in each embodiment acts axially upon the shaft to counter axial force on the shaft resulting from fluid pressure acting upon said inlet end of the shaft, thus dynamically balancing the rotating parts without the necessity for mechanical bearings of any kind in the structure of the nozzle 100, 200.

All printed publications referred to herein are hereby incorporated by reference in their entirety. In accordance with the features and benefits described herein, the present invention is intended to be defined by the claims below and their equivalents.

What is claimed is:

1. A nozzle assembly for spraying high pressure fluid against an object, the assembly comprising:

a hollow housing body;

a hollow tubular shaft member coaxially rotatable within the housing body and having a fluid inlet end within and near one end of said housing body, said shaft member having an outlet end near a second end of the housing body for securing a spray head thereto for rotation with the shaft, said shaft member having a central axial passage to conduct fluid axially from said inlet end through the passage to said outlet end, said body having a high pressure fluid inlet passage communicating with said central passage of said shaft;

a regulating passage formed between said housing body and said shaft near said outlet end of said shaft; and a passage communicating between the central passage of the shaft and a portion of the outer surface of the shaft member, wherein pressure of said fluid within said regulating passage acts axially upon said shaft to counterbalance axial force on said shaft exerted by fluid pressure acting upon said inlet end of said shaft, wherein the housing body has an inlet bearing area supporting the inlet end of the tubular shaft member and has a single annular channel formed in the housing body around the inlet bearing area.

2. A nozzle assembly according to claim 1 wherein said regulating passage is a tapered frusto-conical gap defined between said tubular shaft and said housing body.

3. A nozzle assembly according to claim 2 wherein the volume of said regulating passage is variable as said tubular shaft moves axially within said housing body.

4. A nozzle assembly according to claim 3 wherein during pressurized operation of the nozzle, axial forces on said tubular shaft reach equilibrium, so that there is no axial contact between said tubular shaft and said housing body.

5. A nozzle assembly according to claim 4 wherein during pressurized operation of the nozzle, said tubular shaft is supported within, said housing entirely by a flow of operating fluid between said shaft and said housing.

6. A nozzle assembly for rotatably spraying high pressure cleaning fluid against an object to be cleaned, the assembly comprising:

a hollow cylindrical housing body;

a hollow tubular shaft member coaxially carried within the housing body, the shaft member having a fluid inlet end within and near one end of said housing body, said shaft member having an outlet end projecting from a second end of the housing body, the outlet end configured to receive a spray head fastened thereto for rotation of the head with the shaft, said shaft member having a central passage to conduct fluid axially from said inlet end axially through the inlet end to said outlet end, said housing body having a high pressure fluid inlet passage axially communicating with said central passage of said shaft;

an inner wall of said housing body and a portion of said shaft near said outlet end of said shaft having complementary tapered surface shapes, together forming a regulating passage therebetween;

said shaft member having one or more bores communicating between the central passage of the shaft member and the regulating passage, wherein pressure of cleaning fluid within said regulating passage acts axially upon said shaft to counter axial force on said shaft resulting from fluid pressure acting upon said inlet end of said shaft; and wherein the housing body has an inlet bearing area supporting the inlet end of the tubular shaft member and the housing body has a single annular channel formed around the inlet bearing area abutting the inlet end portion of the shaft member.

7. A nozzle assembly according to claim 6 wherein said regulating passage is a frusto-conical gap defined between said tubular shaft and said housing body.

8. A nozzle assembly according to claim 7 wherein the volume of said regulating passage varies as said tubular shaft moves axially within said housing body.

9. A nozzle assembly according to claim 8 wherein during pressurized operation of the nozzle, axial threes on said tubular shaft reach equilibrium minimizing axial contact between said tubular shaft and said housing body.

10. A nozzle assembly according to claim 6 wherein during pressurized operation of the nozzle, said tubular shaft is supported within said housing entirely by fluid between said shaft and said housing body.

* * * * *

UNITED STATES PATENT AND TRADEMARK OFFICE

CERTIFICATE OF CORRECTION

PATENT NO. : 8,434,696 B2
APPLICATION NO. : 13/495723
DATED : May 7, 2013
INVENTOR(S) : Douglas E. Wright It is certified that error appears in the above-identified patent and that said Letters Patent is hereby corrected as shown below:

In the Claims

1. In Column 8, Line 55, delete “within” and insert -- within, --.

2. In Column 10, Line 11, delete “threes” and insert -- forces --.

Signed and Sealed this
Twenty-second Day of July, 2014

Michelle K. Lee

Michelle K. Lee
*Deputy Director of the United States Patent and Trademark Office*